(12) United States Patent
Kato et al.

(10) Patent No.: US 12,085,653 B2
(45) Date of Patent: Sep. 10, 2024

(54) POSITION ESTIMATION DEVICE, ESTIMATION DEVICE, CONTROL METHOD, PROGRAM AND STORAGE MEDIA

(71) Applicant: PIONEER CORPORATION, Tokyo (JP)

(72) Inventors: Masahiro Kato, Kanagawa (JP);
Kazufumi Fujiya, Kanagawa (JP);
Masahiro Kato, Kanagawa (JP)

(73) Assignee: PIONEER CORPORATION, Tokyo (JP)

( * ) Notice: Subject to any disclaimer, the term of this patent is extended or adjusted under 35 U.S.C. 154(b) by 414 days.

(21) Appl. No.: 17/602,637

(22) PCT Filed: Mar. 31, 2020

(86) PCT No.: PCT/JP2020/014871
§ 371 (c)(1),
(2) Date: Oct. 8, 2021

(87) PCT Pub. No.: WO2020/209144
PCT Pub. Date: Oct. 15, 2020

(65) Prior Publication Data
US 2022/0163680 A1 May 26, 2022

(30) Foreign Application Priority Data
Apr. 9, 2019 (JP) ................. 2019-074347

(51) Int. Cl.
*G01S 19/47* (2010.01)
*G01S 17/89* (2020.01)
*G01S 17/931* (2020.01)

(52) U.S. Cl.
CPC .............. *G01S 19/47* (2013.01); *G01S 17/89* (2013.01); *G01S 17/931* (2020.01)

(58) Field of Classification Search
CPC ....... G01C 15/002; G01C 21/28; G01S 17/42; G01S 17/89; G01S 17/931; G01S 19/393; G01S 19/45; G01S 19/47; G01S 7/4808
See application file for complete search history.

(56) References Cited

U.S. PATENT DOCUMENTS

| | | | | |
|---|---|---|---|---|
| 2010/0157058 A1* | 6/2010 | Feiden | ............... | B60W 40/112 348/148 |
| 2014/0074393 A1* | 3/2014 | Kojima | .............. | G01C 21/3848 701/409 |

(Continued)

FOREIGN PATENT DOCUMENTS

| | | |
|---|---|---|
| JP | 2008-249639 A | 10/2008 |
| JP | 2013-257742 A | 12/2013 |

(Continued)

OTHER PUBLICATIONS

European Patent Office, Extended European Search Report, Application No. 20787492.6, dated Apr. 3, 2023, in 10 pages.

*Primary Examiner* — Timothy X Pham
(74) *Attorney, Agent, or Firm* — PROCOPIO, CORY, HARGREAVES & SAVITCH LLP

(57) ABSTRACT

The own vehicle position estimator 17 of the in-vehicle device 1 acquires the predicted own vehicle position $X^-(t)$ that is a predicted value of the present position and the orientation of the moving body. Then, the own vehicle position estimator 17 acquires: the relative angle $L_\psi(t)$ that is first orientation information indicative of the orientation of the landmark with respect to the vehicle specified based on the measurement data of the landmark by the lidar 2; and the relative angle $L^-_\psi(t)$ that is second orientation information indicative of the orientation of the landmark with respect to the vehicle into which the orientation of the landmark indicated by the landmark information is converted. The own vehicle position estimator 17 corrects the (Continued)

predicted own vehicle position $X^-(t)$ based on the difference between the relative angle $L_\psi(t)$ and the relative angle $L^-_\psi(t)$.

11 Claims, 11 Drawing Sheets

(56) References Cited

U.S. PATENT DOCUMENTS

| | | | |
|---|---|---|---|
| 2018/0059680 A1 | 3/2018 | Tateishi et al. | |
| 2018/0253105 A1 | 9/2018 | Suzuki et al. | |
| 2019/0011282 A1* | 1/2019 | Niihara | G01C 22/00 |
| 2019/0145781 A1 | 5/2019 | Iwai | |
| 2020/0072617 A1* | 3/2020 | Tanaka | G01C 21/1652 |
| 2020/0318971 A1* | 10/2020 | Mori | B60W 30/04 |
| 2020/0334855 A1* | 10/2020 | Higo | G06T 7/0002 |
| 2021/0081682 A1* | 3/2021 | Kumano | G01C 21/3602 |
| 2022/0075385 A1* | 3/2022 | Yamamoto | B62D 15/025 |

FOREIGN PATENT DOCUMENTS

| | | |
|---|---|---|
| JP | 2017-072422 A | 4/2017 |
| JP | 2017-211307 A | 11/2017 |
| WO | 2017/060947 A1 | 4/2017 |
| WO | 2017/199369 A1 | 11/2017 |
| WO | 2018/212294 A1 | 11/2018 |

* cited by examiner

POSITION ESTIMATION DEVICE, ESTIMATION DEVICE, CONTROL METHOD, PROGRAM AND STORAGE MEDIA

TECHNICAL FIELD

The present invention relates to a position estimation technique.

BACKGROUND ART

Conventionally, such a technique is known that a feature situated in a traveling direction of a vehicle is detected by use of a radar or a camera and that the position of the vehicle is calibrated based on the detection result. For example, Patent Literature 1 discloses a technique for estimating the self-position by matching (collating) the output of the measurement sensor with the position information on the feature registered in advance on the map. Further, Patent Literature 2 discloses a own vehicle position estimation technique using a Kalman filter. Furthermore, Patent Literature 3 discloses a technique for calculating the normal angle indicative of the direction of a sign based on the point cloud data of the sign measured by lidar.

PRIOR ART DOCUMENTS

Patent Literature

Patent Literature 1: JP 2013-257742A
Patent Literature 2 JP 2017-072422A
Patent Literature 3 JP 2017-211307A

SUMMARY OF THE INVENTION

Problem to be Solved by the Invention

On or around roads with road signs and white lines such as expressways and major national roads, there are a lot of landmarks that can be used to match the measurement values with the map. On the other hand, in the suburbs, there are roads with fewer landmarks and therefore there are places, for example, where only one road sign can be detected or only one white line on one side can be detected. In addition, although measurement with sufficient distance and angle range can be performed when a high-performance external sensor is mounted, the measurable distance becomes short or the detection angle also becomes narrow when a relatively low-cost external sensor is mounted. In that case, even if there are many landmarks on the road, the number of landmarks that can be measured becomes small.

The present invention has been made to solve the above issues, and a main object thereof is to suitably perform the own vehicle position estimation even in a situation where the number of landmarks that can be detected is small.

Means for Solving the Problem

One invention is a position estimation device including: an acquisition unit configured to acquire a predicted value including a present position of a moving body and an orientation of the moving body; a first calculation unit configured to calculate, on a basis of a measurement value of a feature by a measurement device mounted on the moving body, a first orientation indicative of an orientation of the feature in a coordinate system with respect to the moving body; a second calculation unit configured to calculate a second orientation indicative of an orientation in the coordinate system with respect to the moving body into which an azimuth orientation of the feature indicated by map information is converted; and a correction unit configured to correct the predicted value based on a difference between the first orientation and the second orientation.

Another invention is an estimation device including: a first calculation unit configured to calculate, on a basis of a measurement value of a feature by a measurement device mounted on a moving body, a first orientation indicative of an orientation of the feature in a coordinate system with respect to the moving body; a second calculation unit configured to calculate a second orientation indicative of an orientation in the coordinate system with respect to the moving body into which an azimuth orientation of the feature indicated by map information is converted; and an estimation unit configured to estimate at least one of a present position of the moving body and an orientation of the moving body based on a difference between the first orientation and the second orientation.

Still another invention is a control method executed by a position estimation device, the control method including: an acquisition process to acquire a predicted value including a present position of a moving body and an orientation of the moving body; a first calculation process to calculate, on a basis of a measurement value of a feature by a measurement device mounted on the moving body, a first orientation indicative of an orientation of the feature in a coordinate system with respect to the moving body; a second calculation process to calculate a second orientation indicative of an orientation in the coordinate system with respect to the moving body into which an azimuth orientation of the feature indicated by map information is converted; and a correction process to correct the predicted value based on a difference between the first orientation and the second orientation.

Still another invention is a program executed by a computer, the program causing the computer to function as: an acquisition unit configured to acquire a predicted value including a present position of a moving body and an orientation of the moving body; a first calculation unit configured to calculate, on a basis of a measurement value of a feature by a measurement device mounted on the moving body, a first orientation indicative of an orientation of the feature in a coordinate system with respect to the moving body; a second calculation unit configured to calculate a second orientation indicative of an orientation in the coordinate system with respect to the moving body into which an azimuth orientation of the feature indicated by map information is converted; and a correction unit configured to correct the predicted value based on a difference between the first orientation and the second orientation.

DETAILED DESCRIPTION OF THE PREFERRED EMBODIMENTS

Figure 1:
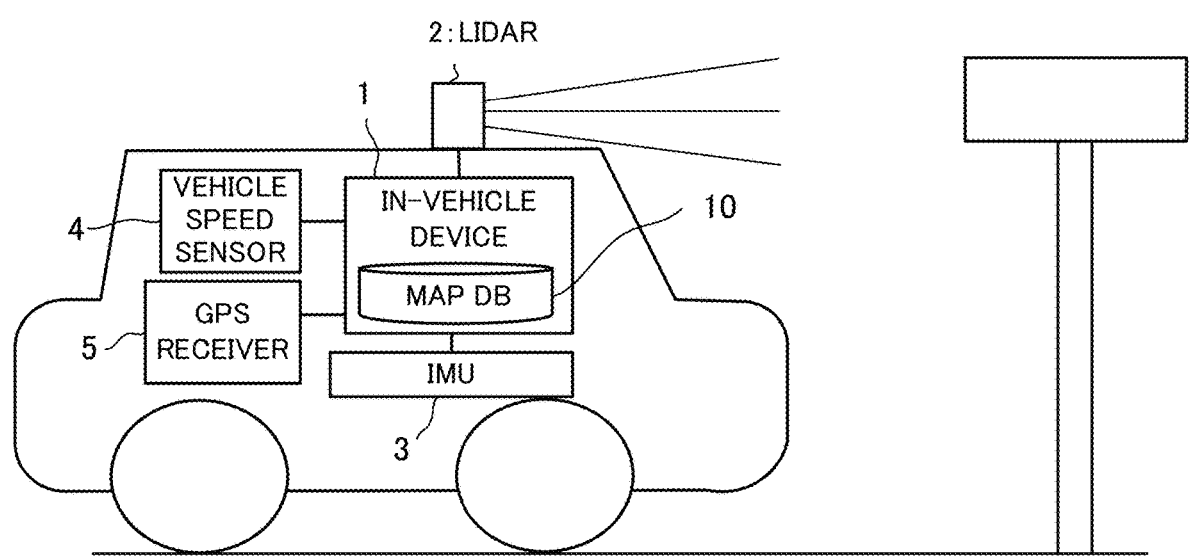
FIG. 1 is a schematic configuration of a driving support system.

According to a preferred embodiment of the present invention, there is provided a position estimation device including: an acquisition unit configured to acquire a predicted value including a present position of a moving body and an orientation of the moving body; a first calculation unit configured to calculate, on a basis of a measurement value of a feature by a measurement device mounted on the moving body, a first orientation indicative of an orientation of the feature in a coordinate system with respect to the moving body; a second calculation unit configured to calculate a second orientation indicative of an orientation in the coordinate system with respect to the moving body into which an azimuth orientation of the feature indicated by map information is converted; and a correction unit configured to correct the predicted value based on a difference between the first orientation and the second orientation. According to this mode, the position estimation device suitably corrects the predicted value including the present position of the moving body and the orientation of the moving body in accordance with the difference between the orientation of the feature specified by the measurement value of the feature by the measurement device and the orientation of the feature specified by the map information, which leads to an accurate position estimation even when the number of features subjected to measurement is small.

In one aspect of the position estimation device, the correction unit corrects the predicted value based on a first difference that is the difference between a measurement distance from the moving body to the feature and a predicted distance measured by the measurement device, the measurement distance being measured by the measurement device, the predicted distance being predicted based on position information regarding the feature included in the map information. According to this mode, the position estimation device can uniquely determine the correction amount for the prediction value of the present position and the direction of the moving body based on the first difference and the second difference. Thus, the position estimation device can perform an accurate position estimation even when the number of features subjected to measurement is one.

In another aspect of the position estimation device, the correction unit corrects the predicted value using the difference multiplied by a Kalman gain. In a preferred example, the correction unit corrects the predicted value of the present position using the difference multiplied by a first Kalman gain, and the correction unit corrects the predicted value of the orientation using the difference multiplied by a second Kalman gain. According to these modes, the position estimation device can accurately determine the correction amount for the present position indicated by the prediction value and the correction amount for the orientation indicated by the prediction value based on the difference between the orientation of the feature specified by the measurement value of the feature by the measurement device and the orientation of the feature specified by the map information, respectively.

In still another aspect of the position estimation device, the position estimation device further includes a third calculation unit configured to calculate measurement accuracy of the first orientation based on measurement accuracy of distance by the measurement device, wherein the correction unit determines, on a basis of the measurement accuracy of the distance and orientation, an observation noise coefficient to be used to calculate the Kalman gain. According to this mode, the position estimation device can calculate the Kalman gain suitably reflecting the accuracies of the distance and the orientation measured by the measurement device.

According to another preferred embodiment of the present invention, there is provided an estimation device including: a first calculation unit configured to calculate, on a basis of a measurement value of a feature by a measurement device mounted on a moving body, a first orientation indicative of an orientation of the feature in a coordinate system with respect to the moving body; a second calculation unit configured to calculate a second orientation indicative of an orientation in the coordinate system with respect to the moving body into which an azimuth orientation of the feature indicated by map information is converted; and an estimation unit configured to estimate at least one of a present position of the moving body and an orientation of the moving body based on a difference between the first orientation and the second orientation. According to this mode, the estimation device suitably corrects at least one of the predicted present position of the moving body or the predicted orientation of the moving body in accordance with the difference between the orientation of the feature specified by the measurement value of the feature by the measurement device and the orientation of the feature specified by the map information, which leads to an accurate position estimation even when the number of features subjected to measurement is small.

According to still another preferred embodiment of the present invention, there is provided a control method executed by a position estimation device, the control method including: an acquisition process to acquire a predicted value including a present position of a moving body and an orientation of the moving body; a first calculation process to calculate, on a basis of a measurement value of a feature by a measurement device mounted on the moving body, a first orientation indicative of an orientation of the feature in a coordinate system with respect to the moving body; a second calculation process to calculate a second orientation indicative of an orientation in the coordinate system with respect to the moving body into which an azimuth orientation of the feature indicated by map information is converted; and a correction process to correct the predicted value based on a difference between the first orientation and the second orientation. By executing the control method, the position estimation device suitably corrects the predicted value including the present position of the moving body and the orientation of the moving body, which leads to an accurate position estimation even when the number of features subjected to measurement is small.

According to still another preferred embodiment of the present invention, there is provided a program executed by a computer, the program causing the computer to function as: an acquisition unit configured to acquire a predicted value including a present position of a moving body and an orientation of the moving body; a first calculation unit configured to calculate, on a basis of a measurement value of a feature by a measurement device mounted on the moving body, a first orientation indicative of an orientation of the feature in a coordinate system with respect to the moving body; a second calculation unit configured to calculate a second orientation indicative of an orientation in the coordinate system with respect to the moving body into which an azimuth orientation of the feature indicated by map information is converted; and a correction unit configured to correct the predicted value based on a difference between the first orientation and the second orientation. By executing the program, the computer suitably corrects the predicted value including the present position of the moving body and the orientation of the moving body, which leads to an accurate position estimation even when the number of features subjected to measurement is small. In some embodiments, the program is stored on a storage medium.

EMBODIMENTS

A preferred embodiment of the present invention is described below with reference to drawings. Hereinafter, for the sake of convenience of explanation, a character with "^" or "-" on the top is expressed in the specification as "A^" or "A-" ("A" stands for a character).

[Schematic Configuration]

FIG. 1 is a schematic configuration diagram of a driving support system according to the present embodiment. The driving support system shown in FIG. 1 is mounted on a vehicle and includes an in-vehicle device 1 for performing control relating to driving assistance of the vehicle, a lidar (Lidar: Light Detection and Ranging, or Laser Illuminated Detection and Ranging) 2, an IMU (Inertial Measurement Unit) 3, a vehicle speed sensor 4, and a GPS receiver 5.

The in-vehicle device 1 is electrically connected to the lidar 2, IMU3, the vehicle speed sensor 4, and the GPS receiver 5, and based on these outputs, estimates the position (also referred to as "own vehicle position") of the vehicle on which the in-vehicle device 1 is mounted. Then, the in-vehicle device 1 performs autonomous driving control of the vehicle so as to travel along a route to the set destination based on the estimation result regarding the own vehicle position. The in-vehicle device 1 stores a map data base (DB) 10 that stores landmark information, which is information relating to road data and features (also referred to as "landmarks") which are provided on or near roads and which serve as marks. Examples of the landmarks described above include features periodically aligned along a road such as kilo-posts, 100 m posts, delineators, traffic infrastructure equipment (e.g., signs, direction signs, traffic signals), utility poles, street lights, and compartment lines (white lines). The compartment line is not limited to a solid line and may be a broken line. Then, the in-vehicle device 1 estimates the own vehicle position by matching (collating) the output of the lidar 2 or the like with the landmark information. The in-vehicle device 1 is an example of the "position estimation device" according to the present invention.

The lidar 2 emits pulsed lasers for a predetermined angular range in the horizontal and vertical directions to thereby discretely measure the distance to an external object and then generates three-dimensional point cloud information indicating the position of the object. In this case, the lidar 2 includes: a radiation (emitting) unit for radiating (emitting) a laser beam while changing the irradiation (emitting) direction; a light receiving unit for receiving the reflected light (scattered light) which is the laser beam reflected by the object; and an output unit for outputting scan data based on the light receiving signal outputted by the light receiving unit. The scan data is point cloud data and is generated based on the irradiation direction corresponding to the laser beam received by the light receiving unit and the distance to the object in the irradiation direction specified by the above-mentioned light receiving signal. The lidar 2, the IMU 3, the vehicle speed sensor 4 and the GPS receiver 5 each supplies outputted data to the in-vehicle device 1. The lidar 2 is an example of a "measurement device" according to the present invention.

Figure 2:
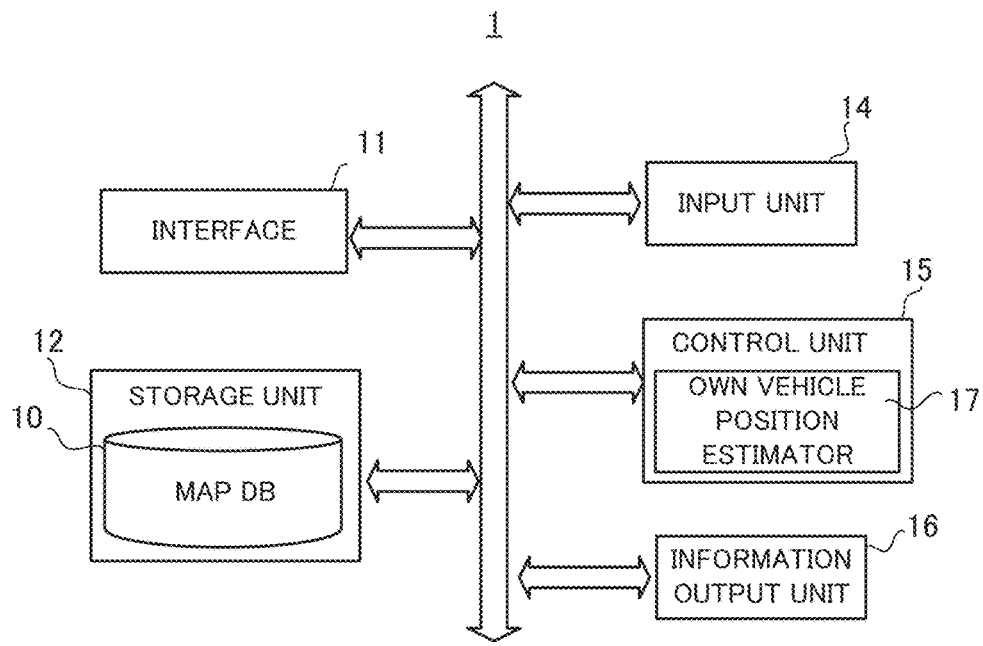
FIG. 2 is a block diagram showing a functional configuration of an in-vehicle device.

FIG. 2 is a block diagram showing a functional configuration of the vehicle-mounted device 1. The in-vehicle device 1 mainly includes an interface 11, a storage unit 12, an input unit 14, a control unit 15, and an information output unit 16. Each of these elements is connected to each other via a bus line.

The interface 11 acquires the output data from the sensors such as the lidar 2, the IMU3, the vehicle speed sensor 4 and the GPS receiver 5, and then supplies it to the control unit 15.

Figure 3:
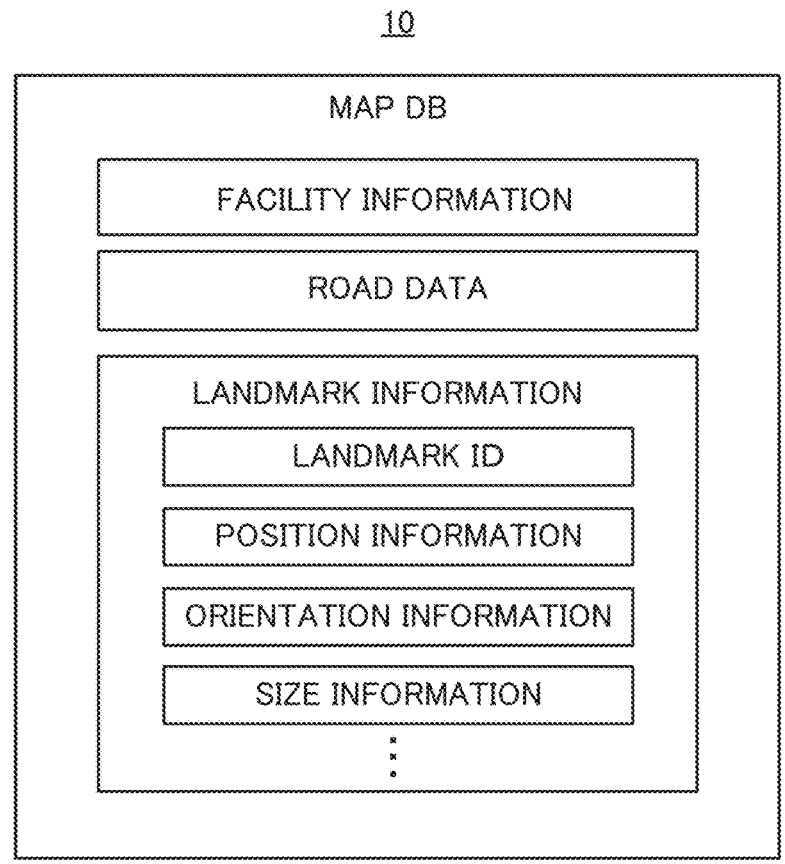
FIG. 3 is an example of a data structure of a map DB.

The storage unit 12 is a memory which stores a program to be executed by the control unit 15, and the information necessary for the control unit 15 to execute a predetermined process. In the present embodiment, the storage unit 12 stores map DB 10 including landmark information. FIG. 3 illustrates an example of the structure of the map DB 10. As shown in FIG. 3, the map DB 10 includes facility information, road data and landmark information.

The landmark information is information relating to each of features serving as a landmark. The landmark information includes landmark ID corresponding to the index of each landmark, position information regarding each landmark, orientation (direction) information regarding each landmark, and size information regarding each landmark. The position information indicates the absolute position of each landmark expressed by the latitude and the longitude (and the altitude) or the like. In a case where the landmark is a compartment line, as the corresponding position information, the coordinate information indicating the discrete positions of the compartment line is at least included. The orientation information is information indicative of the orientation (or azimuth orientation) of the landmark. In the case of a landmark having a planar shape such as a signboard, the orientation information indicates a normal direction (normal vector) to the plane formed on the landmark, or the vector that is the normal vector projected on the x-y plane. In the case of a compartment line provided on the road surface, the orientation information indicates the direction in which the compartment line extends. The size information is information indicative of the size of the landmark. For example, the size information may indicate the vertical length (width) and/or horizontal length (with) of the landmark or may indicate the area of the surface formed on the landmark.

Incidentally, the map DB10 may be updated periodically. In this case, for example, through the communication unit (not shown), the control unit 15 receives, from the server device for managing the map information, the partial map information relating to the area to which the own vehicle position belongs and then reflects it in the map DB 10. The map DB10 may be stored in an external storage device such as an external server instead of being stored in the in-vehicle device 1. In that case, the in-vehicle device 1 acquires at least a portion of the map DB 10 from the external storage device via a wireless communication or the like.

A description will be given of the functional components of the in-vehicle device 1 with reference to FIG. 2 again. The input unit 14 is a button, a touch panel, a remote controller, a voice input device, and/or the like for the user to operate. The information output unit 16 is, for example, a display, a speaker and/or the like for outputting under the control of the control unit 15.

The control unit 15 includes a CPU and/or the like for executing a program, and controls the entire in-vehicle device 1. In this example, the control unit 15 includes an own vehicle position estimator 17 which estimates the position (own vehicle position) of the vehicle on which the vehicle-mounted device 1 is mounted based on the output signals of the sensors supplied from the interface 11 and the map DB 10. Then, the control unit 15 performs a control relating to the driving assistance of the vehicle including the autonomous driving control based on the estimation result of the own vehicle position. The control unit 15 is an example of the "first calculation unit", the "second calculation unit", the "third calculation unit", the "acquisition unit", the "correction unit", the "estimation unit" and the "computer" which executes a program according to the present invention.

[Outline of Own Vehicle Position Estimation Process]

First, a description will be given of an outline of the estimation process of the own vehicle position by the own vehicle position estimator 17.

On the basis of the measurement value indicative of the distance to a landmark and the angle thereto measured by the lidar 2 and the landmark information extracted from the map DB10, the own vehicle position estimator 17 corrects the own vehicle position estimated from the data outputted by the IMU 3, the vehicle speed sensor 4, and/or the GPS receiver 5. In this embodiment, as an example, according to a state estimation method based on the Bayesian estimation, the own vehicle position estimator 17 alternately executes: a prediction step of estimating the vehicle position from the data outputted by the IMU 3 and the vehicle speed sensor 4; and a measurement/update step of correcting the estimate value of the own vehicle position calculated at the preceding prediction step. Various filters developed to perform the Bayesian estimation can be used as a state estimation filter used at these steps, and examples of such filters include an extended Kalman filter, an answered Kalman filter and a particle filter. Thus, various methods have been proposed for the position estimation based on the Bayesian estimation. In the following, a simplified description will be given of the own vehicle position estimation using the extended Kalman filter as a representative example.

Figure 4:
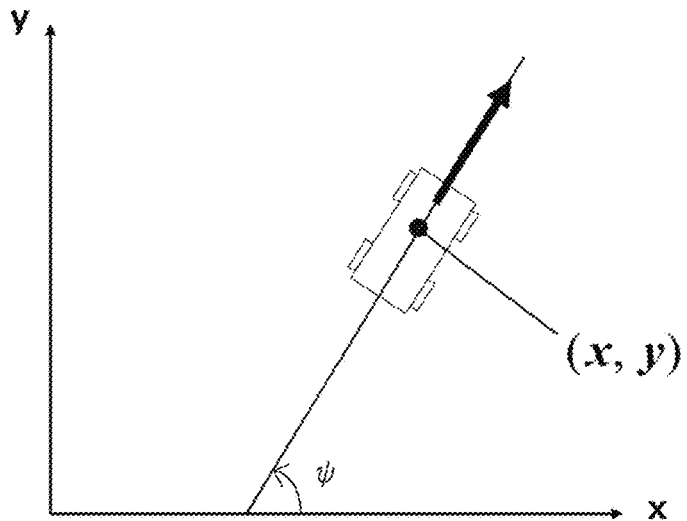
FIG. 4 illustrates a state variable vector in a two-dimensional orthogonal coordinate system.

FIG. 4 is a diagram showing a state variable vector x in a two-dimensional orthogonal coordinate system. As shown in FIG. 4, the position of the vehicle in the plane defined on the x-y two-dimensional orthogonal coordinate system is represented by the coordinates "(x, y)" and the azimuth orientation "ψ" of the own vehicle. Here, the azimuth orientation ψ is defined as the angle formed between the front direction of the vehicle and the x axis. The coordinates (x, y) indicate, for example, an absolute position corresponding to the combination of the latitude and the longitude, or any other world coordinates indicating a position where the origin is set to a predetermined point. Here, the front direction of the vehicle is a direction corresponding to the traveling direction when the vehicle advances and corresponds to an example of the orientation of the moving body.

Figure 5:
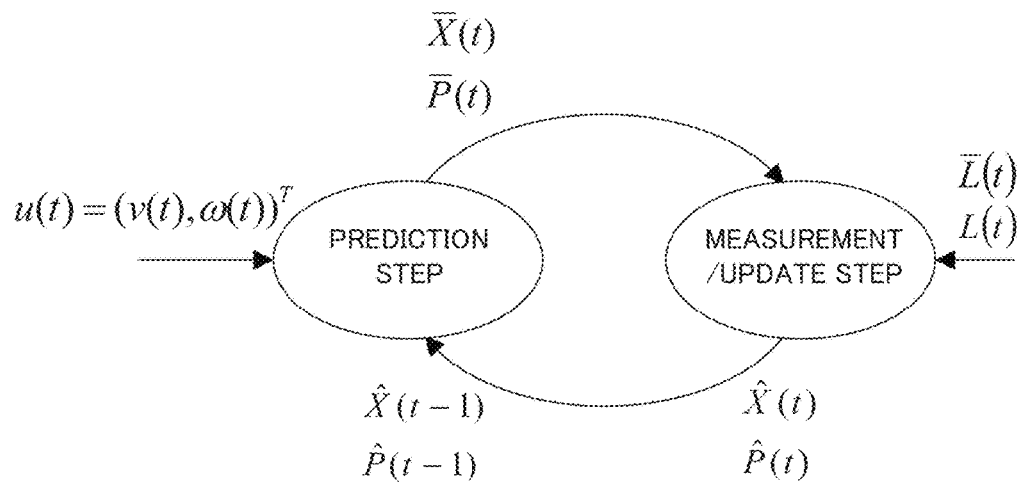
FIG. 5 illustrates a schematic relationship between the prediction step and the measurement update step.

FIG. 5 is a diagram showing a schematic relationship between the prediction step and the measurement/update step. As shown in FIG. 5, by repeating the prediction step and the measurement/update step, the calculation and update of the estimate value of the state variable vector "X" indicating the position of the own vehicle are sequentially executed. In FIG. 5, the state variable vector at the target reference time of calculation (i.e., the current time) "t" is denoted as "X⁻(t)" or "X^(t)", wherein X(t)=(x(t), y(t), λ(t))$^T$. Here, the provisional estimate value (prediction value) estimated at the prediction step is denoted by "⁻" on the character representing the prediction value, and the higher precision estimate value updated at the measurement/update step is denoted by "^" on the character representing the estimate value.

At the predicting step, the own vehicle position estimator 17 uses the moving velocity "v" and the angular velocity (yaw rate) "ω" (these are collectively referred to as "control value u (t)=(v (t), ω (t))$^T$".) of the vehicle to determine the moving distance and the azimuth orientation variation from the previous time. The own vehicle position estimator 17 adds the determined moving distance and azimuth orientation variation to the state variable vector X^(t−1) at the time t−1 calculated at the preceding measurement/update step, and calculates the predicted value (also referred to as the "predicted own vehicle position X⁻(t)") of the own vehicle position at the time t. At the same time, the covariance matrix "P⁻(t)" corresponding to the error distribution of the predicted own vehicle position X⁻(t) is calculated from the covariance matrix "P^(t−1)" at time t−1 calculated at the previous measurement/update step.

At the measurement/update step, the own vehicle position estimator 17 associates the position vector of the target landmark of the measurement registered in the map DB 10 with the scan data by the lidar 2. Then, when the above association is performed successfully, the own vehicle position estimator 17 acquires the measurement value "L(t)" of the associated landmark generated by the lidar 2 and the predicted measurement value ("predicted measurement value L⁻(t)") of the associated landmark, wherein the predicted measurement value L⁻(t) is obtained by modeling the measurement process in the lidar 2 using the predicted own vehicle position X⁻(t) and the position vector of the associated landmark registered in the map DB 10. The measurement value L(t) is a vector value in a coordinate system (also referred to as "vehicle coordinate system") into which the distance and the scan angle of the landmark measured by the lidar 2 at time t are converted, wherein the vehicle coordinate system has a fist axis corresponding to the front direction of the vehicle and a second axis corresponding the side direction of the vehicle.

Then, at the measurement/update step, the own vehicle position estimator 17 calculates the updated state variable vector (also referred to as the "estimated own vehicle position X^(t)") by multiplying the difference value between the measurement value L(t) and the predicted measurement value L⁻(t) by the Kalman gain "K(t)" and adding this to the predicted own vehicle position X⁻(t), as shown in the following equation (1).

$$\hat{X}(t) = \overline{X}(t) + K(t)\{L(t) - \overline{L}(t)\} \tag{1}$$

Further, at the measurement/update step, as with the prediction step, the own vehicle position estimator 17 obtains the covariance matrix P^(t) (also referred to simply as P(t)) corresponding to the error distribution of the estimated own vehicle position X^(t) from the covariance matrix P⁻(t). For example, it is possible to calculate parameters such as a Kalman gain K(t) in the same way as any known self-position estimation technique using an extended Kalman filter.

It is noted that, when the position vectors of multiple landmarks registered in the map DB 10 are associated with the scan data by the lidar 2, the vehicle position estimation unit 17 may perform the measurement/update step based on a set of the predicted measurement value and the measurement value corresponding to any one landmark selected from the multiple landmark, or may repeatedly and sequentially perform the measurement/update step based on all sets of the predicted measurement value and the measurement value corresponding to the multiple landmarks. In such a case where a plurality of sets of the predicted measurement value and the measurement value are used, the vehicle position estimation unit 17 may reduce the weight on a landmark with increasing distance between the lidar 2 and the landmark in consideration of such a fact that the lidar measurement accuracy deteriorates as the landmark is farther from the lidar 2.

[Own Vehicle Position Estimation Using Landmark Orientation Information]

Next, a description will be given of the own vehicle position estimation processing using the orientation information regarding the landmark. Schematically, the own vehicle position estimator 17 measures the orientation of the landmark subjected to the measurement and acquires the orientation information regarding the landmark registered in the map DB10 to form a Kalman filter using the difference value between the measurement value and the predicted value regarding not only the position but also the azimuth orientation and calculate the estimated own vehicle position X^(t). Thereby, the own vehicle position estimator 17 calculates the estimated own vehicle position X^(t) with a high degree of accuracy even when the vehicle position estimation process is performed by use of one landmark as a measurement target.

(1) Process Overview

Figure 6A:
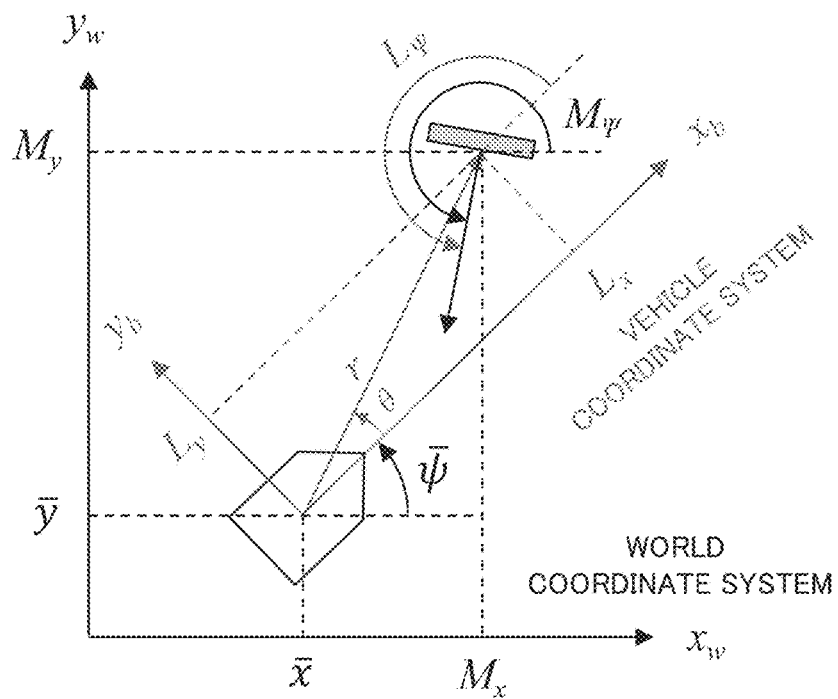
FIG. 6A and FIG. 6B illustrate a positional relationship between a vehicle and a landmark in the world coordinate system and in the vehicle coordinate system.

FIG. 6A is a diagram showing the positional relationship between the vehicle and the landmark in the world coordinate system and in the vehicle coordinate system when the target landmark of measurement is a signboard. Here, the world coordinate system has a coordinate axis "$x_w$" and a coordinate axis "$y_w$" with a predetermined point as the origin and perpendicular to each other, and the vehicle coordinate system has a coordinate axis "$x_b$" along the front direction of the vehicle and a coordinate axis "$y_b$" along the side direction of the vehicle, with the center of the vehicle as the origin. FIG. 6A illustrates the predicted own vehicle position "X⁻=(x⁻, y⁻, ψ⁻)$^T$" in the world coordinate system, the position vector "M=($M_x$, $M_y$, $M_\psi$)$^T$" of the landmark in the world coordinate system based on the map DB 10 and the measurement value "L=($L_x$, $L_y$, $L_\psi$)$^T$" in the vehicle coordinate system.

In this case, according to the following equation (2), the own vehicle position estimator 17 calculates the measurement value L(t)=($L_x$(t), $L_y$(t), $L_\psi$(t))$^T$, using the distance "r(t)" and the azimuth orientation "θ" which the lidar 2 outputs with respect to the target landmark of measurement.

$$L(t) = \begin{bmatrix} L_x(t) \\ L_y(t) \\ L_\psi(t) \end{bmatrix} = \begin{bmatrix} r(t)\cos\theta(t) \\ r(t)\sin\theta(t) \\ L_\psi(t) \end{bmatrix} \tag{2}$$

Here, the angle θ which the lidar 2 outputs is assumed to indicate the orientation of the landmark in the vehicle coordinate system with respect to the origin (i.e., the vehicle position) of the vehicle coordinate system.

Here, the own vehicle position estimator 17 can calculate the relative angle $L_\psi$ which indicates the orientation of the measured landmark according to the equation (2) by using the point cloud data of the surface of the landmark measured by the lidar 2. Specifically, the own vehicle position estimator 17 calculates an expression representing the plane of the landmark through regression analysis from the coordinates of the respective measurement points on the plane of the landmark, and then calculates a normal vector for this plane, and then projects the normal vector on the x-y plane to thereby calculate the relative angle $L_\psi$ of the landmark in the vehicle coordinate system. Details of this process are disclosed in, for example, Patent Literature 3. The relative angle $L_\psi$ is one example of the "first orientation" according to the present invention.

The own vehicle position estimator 17 calculates the predicted measurement value L⁻(t)=(L⁻$_x$(t), L⁻$_y$(t), L⁻$_\psi$(t))$^T$ based on the following equation (3) using the predicted own vehicle position X⁻(t)=(x⁻(t), y⁻(t), ψ⁻(t))$^T$ and the position vector M=($M_x$(t), $M_y$(t), $M_\psi$(t))$^T$ of the landmark on the map.

$$\overline{L}(t) = \begin{bmatrix} \overline{L}_x(t) \\ \overline{L}_y(t) \\ \overline{L}_\psi(t) \end{bmatrix} = \begin{bmatrix} \cos\overline{\psi}(t) & \sin\overline{\psi}(t) & 0 \\ -\sin\overline{\psi}(t) & \cos\overline{\psi}(t) & 0 \\ 0 & 0 & 1 \end{bmatrix} \begin{bmatrix} M_x(i) - \overline{x}(t) \\ M_y(i) - \overline{y}(t) \\ M_\psi(i) - \overline{\psi}(t) \end{bmatrix} \tag{3}$$

The relative angle L⁻$_\psi$ is an example of the "second orientation" according to the present invention.

Further, the own vehicle position estimator 17 calculates the estimated own vehicle position X^(t) by correcting the predicted own vehicle position X⁻(t) based on the value obtained by multiplying the difference between the measurement value L(t) including the relative angle $L_\psi$ and the predicted measurement value L⁻(t) including the relative angle L⁻$_\psi$ by the Kalman filter K(t). In other words, the own vehicle position estimator 17 calculates the estimated own vehicle position X^(t)=(x^(t), y^(t), ψ^(t))$^T$ based on the following equation (4) corresponding to the equation (1).

$$\begin{bmatrix} \hat{x}(t) \\ \hat{y}(t) \\ \hat{\psi}(t) \end{bmatrix} = \begin{bmatrix} \overline{x}(t) \\ \overline{y}(t) \\ \overline{\psi}(t) \end{bmatrix} + \begin{bmatrix} k_{11}(t) & k_{12}(t) & k_{13}(t) \\ k_{21}(t) & k_{22}(t) & k_{23}(t) \\ k_{31}(t) & k_{32}(t) & k_{33}(t) \end{bmatrix} \begin{bmatrix} L_x(t) - \overline{L}_x(t) \\ L_y(t) - \overline{L}_y(t) \\ L_\psi(t) - \overline{L}_\psi(t) \end{bmatrix} \tag{4}$$

Here, according to the equation (4), the difference value between the measurement value L(t) and the predicted measurement value $L^-(t)$ for each of the three elements, the x direction, y direction, and azimuth orientation ψ is used to calculate each of the three parameters $\hat{x}$, $\hat{y}$, $\hat{\psi}$, which are the elements of the estimated own vehicle position $\hat{X}$. Thus, even when the vehicle position estimation process is performed with one target landmark of measurement, the correction amount for the three elements (x-direction, y-direction, and azimuth orientation ψ) of the estimated own vehicle position $\hat{X}$ is uniquely determined. It is noted that the coefficient $k_{13}$ (t) and the coefficient $k_{23}$ (t) in the Kalman gain K(t) is an example of the "first Kalman gain" according to the present invention and that the coefficient $k_{33}$ (t) is an example of the "second Kalman gain" according to the present invention.

Figure 6B:
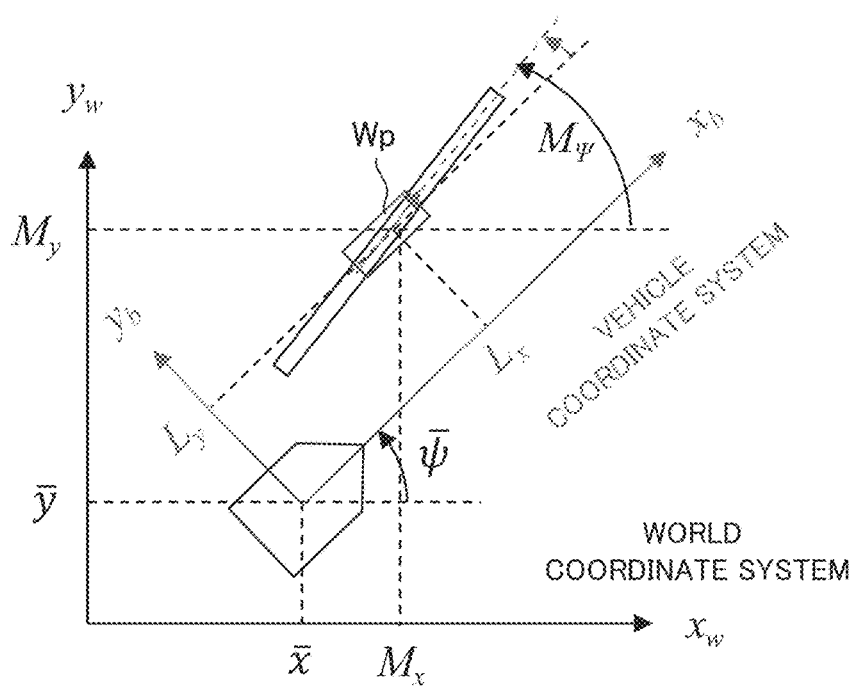

FIG. 6B is a diagram showing the positional relationship between the vehicle and the landmark in the world coordinate system and in the vehicle coordinate system when the target landmark of measurement is a compartment line. When the landmark to be measured is a compartment line, the own vehicle position estimator 17 calculates the measurement value L(t), the predicted measurement value $L^-(t)$, and the estimated own vehicle position $\hat{X}(t)$ based on the equations (2) to (4), respectively.

Here, a supplementary explanation will be given of the calculation method of the predicted measurement value $L^-(t)$ based on the equation (3) when the target landmark of the measurement is a compartment line. If the landmark is a compartment line, the corresponding landmark information includes, as orientation information shown in FIG. 6B, the orientation information $M_\psi$ which indicates the direction (extension direction) along the compartment line in the world coordinate system. Therefore, when calculating the predicted measurement value $L^-(t)$ by referring to the landmark information corresponding to the compartment line, the own vehicle position estimator 17 calculates the equation (3) using this orientation information $M_\psi$. If the orientation information $M_\psi$ is not included in the landmark information, the own vehicle position estimator 17 generates the orientation information by applying the least-squares method to the coordinate values of the previous and next several points in the point cloud data.

Next, a supplementary explanation will be given of the calculation method for the measurement value $L(t)=(L_x(t), L_y(t), L_\psi(t))^T$ when the landmark is a compartment line. When the landmark is a compartment line, the landmark information includes, as the position information, for example, the coordinate information such as latitude and longitude indicating the discrete positions (discrete points) on the compartment line at intervals of several meters.

In this case, first, the own vehicle position estimator 17 sets a prediction window "Wp" which determines a range for detecting the compartment line in at least one direction (in FIG. 6B left front) selected from the left front of the vehicle, the left rear thereof, the right front thereof and the right rear thereof, wherein the center of the prediction window Wp is set to the predicted position of the compartment line which is the discrete point of the compartment line closest to a position that is a predetermined distance away from the vehicle. Then, the own vehicle position estimator 17 extracts, from the measurement data outputted by the lidar 2, measurement points which have high reflectance equal to or larger than a predetermined threshold value and which exist in the predictive window Wp and on the road surface. Then, the own vehicle position estimator 17 calculates the $x_b$ coordinate value and the $y_b$ coordinate value of the center position of the respective positions indicated by the extracted measurement points as $L_x$ (t), $L_y$ (t), respectively. Further, the own vehicle position estimator 17 calculates the center point (e.g., the center position of the measurement points for each scan line) on the compartment line for each scan line and then calculates the relative angle $L_\psi$ (t) based on the slope of the regression line obtained from the center points for the scan lines through the least squares method or the like.

(2) Block Configuration

Next, a functional block configuration of the own vehicle position estimator 17 will be described.

Figure 7:
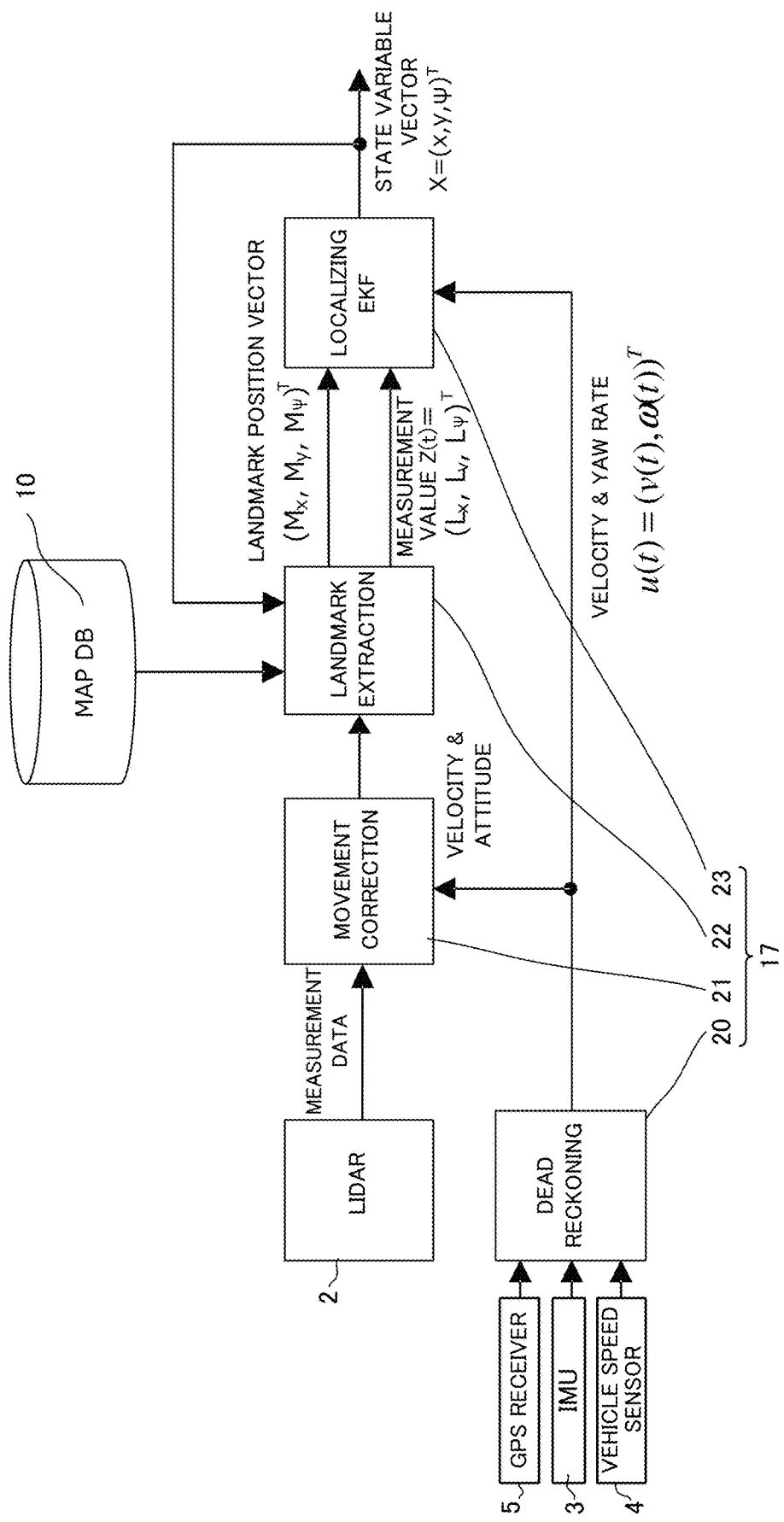
FIG. 7 illustrates an example of a functional block of the position estimation unit of the vehicle.

FIG. 7 shows an example of a functional block of the own vehicle position estimator 17. As shown in FIG. 7, the own vehicle position estimator 17 includes a dead reckoning block 20, a movement correction block 21, a landmark extracting block 22, and a localized EKF (Extended Kalman Filter) block 23.

The dead reckoning block 20 calculates the moving velocity v of the vehicle, the yaw rate ω of the vehicle, and the attitude information of the vehicle (e.g., yaw angle, pitch angle and roll angle of the vehicle) based on the data outputted from the IMU 3, the vehicle speed sensor 4 and the GPS receiver 5. Then, dead reckoning block 20 supplies the moving velocity v and the attitude information of the vehicle to the movement correction block 21, and supplies a control value $u(t)=(v(t), \omega(t))^T$ to the localized EKF block 23.

The movement correction block 21 corrects the measurement data outputted from the lidar 2 based on the moving velocity v and the attitude information supplied from the dead reckoning block 20. For example, when the scan period is 100 ms, since the vehicle moves during that 100 ms, even if the same object located in front is measured, the measurement distance at the start of scanning in one scan frame becomes long whereas the measurement distance at the end of scanning in one scan frame becomes short. Therefore, the above correction keeps the measurement distance constant within one scan frame. Then, the movement correction block 21 supplies the measurement data measured by the lidar 2 after the correction to the landmark extraction block 22.

On the basis of the estimated own vehicle position $\hat{X}(t-1)$ calculated by the localized EKF block 23 at the preceding time, the landmark extraction block 22 extracts, from the map DB 10, the position vector $M=(M_x, M_y, M_\psi)^T$ of the landmark situated within the measurement range by the lidar 2 that is around the own vehicle. Then, the landmark extraction block 22 supplies the localized EKF block 23 with the measurement value $L(t)=(L_x, L_y, L_\psi)^T$ that is based on the measurement data of the landmark by the lidar 2 and the position vector $M=(M_x, M_y, M_\psi)^T$.

In this case, on the basis of the equation (2), the landmark extraction block 22 converts the measurement data by the lidar 2 indicating the combination (r(t), θ(t)) supplied from the movement correction block 21 into the measurement value $L(t)=(L_x, L_y, L_\psi)^T$ that is a vector value in the vehicle coordinate system whose axes correspond to the front direction and the lateral direction of the vehicle, respectively. In this case, for example, on the basis of the information on the installation position and the installation attitude (posture) for the vehicle of the lidar 2 stored in the storage unit 12 or the like, the landmark extraction block 22 converts the measurement data measured by the lidar 2 expressed in the lidar coordinate system with respect to the lidar 2 into the measurement value L(t) in the vehicle coordinate system with respect to the vehicle.

In practice, the landmark has a predetermined size and data corresponding to a plurality of measurement points on the surface thereof irradiated with the laser beam emitted by the lidar 2 is acquired as the point cloud data. Therefore, for example, the landmark extraction block 22 calculates the measurement value L(t) corresponding to the center position of the target landmark by averaging the measurement values at the respective measurement points of the target landmark of the measurement, and supplies the measurement value L(t) to the localized EKF block 23.

The localized EKF block 23 calculates the estimated own vehicle position X^(t) by performing the calculation shown in the equation (4), and updates the parameters such as the Kalman gain K(t) and the covariance matrix P^(t). In this case, the localized EKF block 23 calculates the predicted own vehicle position X⁻(t) based on the estimated own vehicle position X^(t−1) calculated at the preceding time and the control value u(t) supplied from the dead reconning block 20 while calculating the predicted measurement value L⁻(t) using the equation (3) based on the position vector M supplied from the landmark extraction block 22 and the predicted own vehicle position X⁻(t). The updating method of Kalman gain K(t) will be described later.

(3) Update Method of Kalman Gain

Next, a description will be given of the update method of the Kalman gain K(t). Summarily, the own vehicle position estimator 17 calculates the diagonal components of the observation noise matrix "R(t)", which is used in calculating the Kalman gain K(t), corresponding to the x-direction, y-direction, and azimuth orientation ψ, respectively, based on the measurement accuracy by the lidar 2 and the accuracy of the map DB10 (i.e., landmark information). Thereby, the own vehicle position estimator 17 suitably determines each element of the Kalman gain K(t) by which the difference value between the measurement value L(t) and the predicted measurement value L⁻(t) with respect to each of the x-direction, y-direction, and azimuth orientation ψ is to be multiplied.

The Kalman gain K(t) is calculated according to the following general equation (5) which uses the observed noise matrix R(t), the Jacobian matrix "H(t)" with three rows and three columns for the predicted measurement value L⁻(t), and the covariance matrix P⁻(t) with three rows and three columns.

$$K(t) = \overline{P}(t)H(t)^T\{H(t)\overline{P}(t)H(t)^T + R(t)\}^{-1} \quad (5)$$

Then, in this embodiment, the observation noise matrix R(t) is calculated according to the following equation (6).

$$R(t) = \begin{bmatrix} a_{Lx} \times \sigma_{Lx}(t)^2 + a_{Mx} \times \sigma_{Mx}(i)^2 & 0 & 0 \\ 0 & a_{Ly} \times \sigma_{Ly}(t)^2 + a_{My} \times \sigma_{My}(i)^2 & 0 \\ 0 & 0 & a_{L\psi} \times \sigma_{L\psi}(t)^2 + a_{M\psi} \times \sigma_{M\psi}(i)^2 \end{bmatrix} \quad (6)$$

Here, "$\sigma_{Mx}(i)$" denotes the map accuracy regarding the measurement target landmark with the index "i" in the $x_b$ direction, "$\sigma_{My}(i)$" denotes the map accuracy regarding the landmark with the index i in the $y_b$ direction, and "$\sigma_{M\psi}(i)$" denotes the map accuracy regarding the azimuth orientation ψ of the landmark with the index i. Also, "$\sigma_{Lx}(i)$" indicates the measurement accuracy of the landmark with the index i by the lidar 2 in the $x_b$ direction, "$\sigma_{Ly}(i)$" indicates the measurement accuracy of the landmark with the index i by the lidar 2 in the $y_b$ direction, and "$\sigma_{L\psi}(i)$" indicates the measurement accuracy regarding the azimuth orientation ψ of the landmark with the index i by the lidar 2. Furthermore, "$a_{Mx}$" denotes the noise coefficient of the map in the $x_b$ direction, "$a_{My}$" denotes the noise coefficient of the map in the $y_b$ direction, and "$a_{M\psi}$" denotes the noise coefficient of the map regarding the azimuth orientation ψ. Also, "$a_{Lx}$" denotes the noise coefficient of the measurement value by the lidar 2 in the $x_b$ direction, "$a_{Ly}$" denotes the noise coefficient of the measurement value by the lidar 2 in the $y_b$ direction, and "$a_{L\psi}$" indicates the noise coefficient of the measurement value by the lidar 2 in the azimuth orientation ψ.

Next, a description will be given of a method of determining the measurement accuracy $\sigma_{L\psi}(i)$ and the noise coefficient $a_{L\psi}$ described above. The measurement accuracies $\sigma_{Lx}(i)$ and $\sigma_{Ly}(i)$ can be determined by decomposing the measurement accuracy by the lidar 2 according to the specifications (or information obtained based on experiments, etc.) into the accuracy in the $x_b$ direction and the accuracy in the $y_b$ direction, for example. The noise coefficients $a_{Lx}$ and $a_{Ly}$ may be set to a predetermined value or may be set to the same value as the noise coefficient $a_{L\psi}$ to be described later. Further, the map accuracies $\sigma_{Mx}(i)$, $\sigma_{My}(i)$, $\sigma_{M\psi}(i)$ and the map noise coefficients $a_{Mx}$, $a_{My}$, $a_{M\psi}$ may be determined based on, for example, information on the accuracy recorded in the map DB 10 or may be set to predetermined values. It is noted that, since the map accuracy is based on the world coordinate system, it is necessary to convert the accuracy in the world coordinate system to the accuracy in the vehicle coordinate system and that, However, when the accuracy is the same in the $x_w$ direction and the $y_w$ direction, it is not necessary to convert it since the accuracy in the vehicle coordinate system is the same as the accuracy in the world coordinate system.

First, with respect to the measurement accuracy $\sigma_{L\psi}(i)$, for example, the own vehicle position estimator 17 calculates the measurement accuracy $\sigma_{L\psi}(i)$ using both the measurement accuracy of the measurement target landmark in the $x_b$ direction and the measurement accuracy thereof in the $y_b$ direction according to the following equation (7).

$$\sigma_{L\psi}(t)^2 = \sigma_{Lx}(t)^2 + \sigma_{Ly}(t)^2 \quad (7)$$

In this way, the own vehicle position estimator 17 determines the measurement accuracy $\sigma_{L\psi}(i)$ according to the equation (7) that is equivalent to the distance calculation formula thereby to determine the measurement accuracy $\sigma_{L\psi}(i)$ in consideration of both the measurement accuracy in the $x_b$ direction and the measurement accuracy in the $y_b$ direction.

Figure 8A:
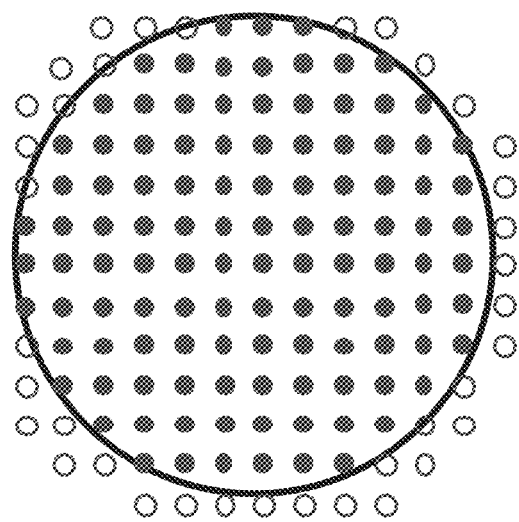
FIG. 8A illustrates a front view of the irradiated surface of the landmark clearly indicating the measurement point by the lidar.

Next, a description will be given of the method of setting the noise coefficient $a_{L\psi}$ when the target landmark of the measurement is a feature (e.g., a signboard or a sign) other than the compartment line. FIG. 8A shows a front view of the irradiated surface of the landmark clearly indicating the measurement points by the lidar 2. In FIG. 8A, each measurement point of the landmark is represented by a point and each of the other measurement points such as a measurement point corresponding to the edge of the landmark and a measurement point out of the landmark is represented by a circle.

The own vehicle position estimator 17 determines the noise coefficient $a_\psi$ based on the number of the measurement points of the measurement target landmark selected from the point cloud data outputted by the lidar 2. Specifically, when "Np" denotes the number of the measurement points of the measurement target landmark and "C" denotes the predetermined constant value, the own vehicle position estimator 17 calculates the noise coefficient $a_{L\psi}$ according to the following equation (8).

$$a_{L\psi}(t) = \frac{C}{N_p(t)} \quad (8)$$

According to the equation (8), the own vehicle position estimator 17 can decrease the noise coefficient $a_{L\psi}$ with the increase in the number Np of the measurement points. As described above, when the landmark is a feature other than the compartment line, the own vehicle position estimator 17 calculates the normal vector with respect to the plane of the landmark from the coordinates of the respective measurement points on the plane of the landmark, and then calculates the relative angle $L_\psi$ by projecting the normal vector on the x-y plane. Therefore, in this case, it is estimated that the more the number Np of the measurement points increases, the higher the calculation accuracy of the normal vector with respect to the plane of the landmark becomes. In consideration of the above fact, the own vehicle position estimator 17 decreases the noise coefficient $a_{L\psi}$ with the increase in the number Np of the measurement points.

Next, a description will be given of the method of setting the noise coefficient $a_{L\psi}$ when the landmark of the measurement target is a compartment line.

In this case, the own vehicle position estimator 17 determines the noise coefficient $a_{L\psi}$ based on the difference between the expected values and the measurement values of: the number of the scan lines in the prediction window Wp; and the width of the compartment line. Specifically, the own vehicle position estimator 17 calculates the noise coefficient $a_{L\psi}$ according to the following equation (9), wherein "$N_M$" denotes the expected value of the number of the scan lines on the compartment line in the prediction window Wp (i.e., the number of the scan lines in the prediction window Wp), and "$N_L$" denotes the measurement value of the number of the scan lines on the compartment line in the prediction window Wp and "$W_M$" denotes the expected value of the width of each scan line on the compartment line in the prediction window Wp (i.e., the width of the measurement target compartment line registered in the map DB 10) and "$W_L$" denotes the measurement value of the width of each scan line on the compartment line in the prediction window Wp.

$$a_{L\psi}(t) = \frac{N_M}{N_L(t)} \cdot \sum_{i=1}^{N_L(t)} |W_L(t) - W_M| \quad (9)$$

Figure 8B:
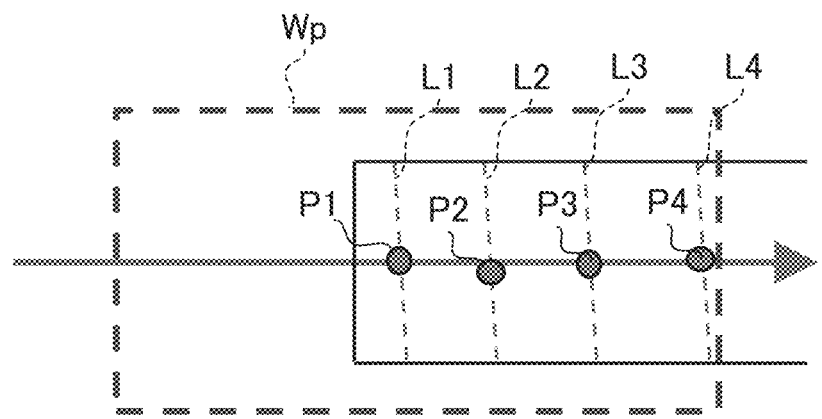
FIG. 8B illustrates the center point of each scan line and each scan line in a prediction window when the compartment line is a broken line.
Figure 8C:
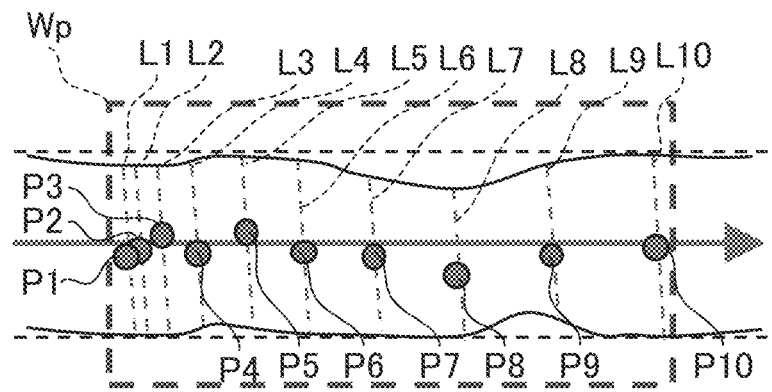
FIG. 8C illustrates the center point of each scan line and each scan line in the prediction window when the compartment line is deteriorated.

FIG. 8B shows the scan lines L1 to L4 in the prediction window Wp and the center points P1 to P4 when the compartment lines are dashed lines. FIG. 8C shows the scan lines L1 to L10 in the prediction window Wp and the center points P1 to P10 of the scan lines when the compartment line is deteriorated.

In the example of FIG. 8B, since the target compartment line of the measurement is a broken line, there are interrupted portions of the compartment line in the prediction window Wp. Therefore, in this case, the difference between the expected value $N_M$ (10 in this case) of the number of scan lines in the prediction window Wp and the measurement value $N_L$ (4 in this case) becomes large, and the noise coefficient $a_{L\psi}$ based on the equation (9) increases in accordance with the ratio of the expected value $N_M$ to the measurement value $N_L$. Further, in the example of FIG. 8C, since the target compartment line of the measurement is degraded, the measurement value $W_L$ is shorter than the expected value $W_M$ depending on the scan line due to partial missing or the like of the compartment line. Therefore, in this case, the sum (accumulated amount) of the difference between the expected value $W_M$ and the measurement value $W_L$ for each scan line increases, and the noise coefficient $a_{L\psi}$ based on the equation (9) increases with the increase in the sum (accumulated amount) of the difference described above.

Here, a supplementary description will be given of the equation (9). As described above, on the basis of the regression line obtained by applying the least squares method or the like to the center points of the scan lines on the compartment line, the own vehicle position estimator 17 calculates the relative angle $L_\psi$ (t) in the vehicle coordinate system indicative of the direction in which the compartment line extends. Therefore, it is estimated that the smaller the number of the center points of the scan lines, the lower the calculation accuracy of the regression line used for calculating the relative angle $L_\psi$ (t) becomes. In consideration of the above fact, the own vehicle position estimator 17 increases the noise coefficient $a_{L\psi}$ with the decrease in the measurement value $N_L$ (that is, with the increase in the ratio of the expected value $N_M$ to the measurement value $N_L$) according to the equation (9).

Further, when the target compartment line of the measurement is degraded, the width of the compartment line to be used for the calculation of the relative angle $L_\psi$ (t) varies due to the presence of peeled portions of the compartment line. In accordance with the variation, the center point of each scan line also varies and, as a result, the calculation accuracy of the relative angle $L_\psi$ (t) deteriorates. Taking the above fact into consideration, according to the equation (9), the own vehicle position estimator 17 increases the noise coefficient $a_{L\psi}$ with the increase in the difference between the measurement value $W_L$ of the width of the compartment line and the width $W_M$ of the compartment line.

(4) Process Flow

Figure 9:
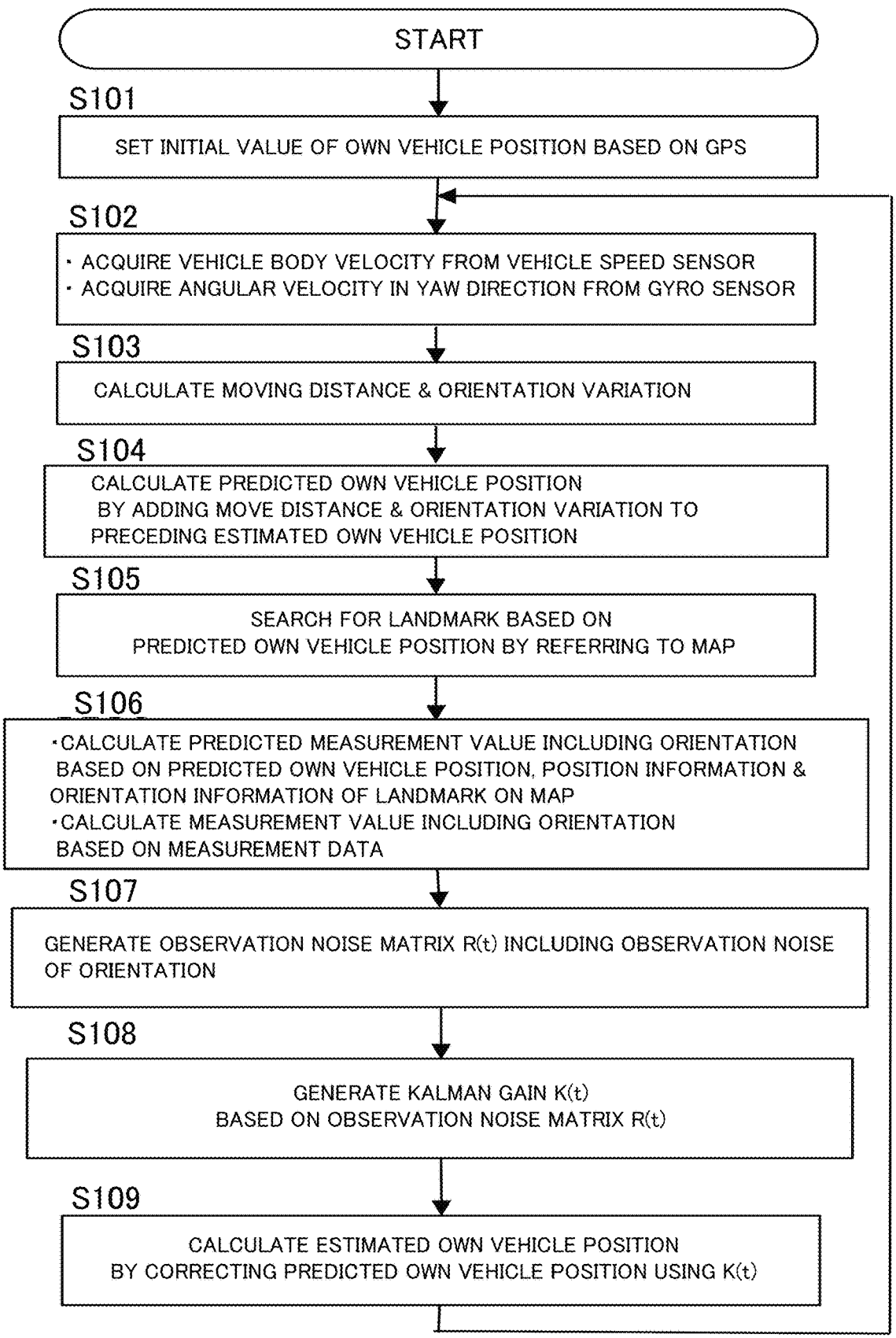
FIG. 9 is a flowchart of the vehicle position estimation process.

FIG. 9 is a flowchart of the in-vehicle position estimation process performed by the in-own vehicle position estimator 17 of the in-vehicle device 1. The in-vehicle device 1 repeatedly executes the process of the flowchart shown in FIG. 9.

First, the own vehicle position estimator 17 sets the initial (default) value of the own vehicle position based on the output of the GPS receiver 5 or the like (step S101). Next, the own vehicle position estimator 17 acquires the vehicle body velocity from the vehicle speed sensor 4 and acquires the angular velocity in the yaw direction from the IMU 3 (step S102). Then, the own vehicle position estimator 17 calculates the moving distance of the vehicle and the orientation variation (direction change) of the vehicle based on the result obtained at step S102 (step S103).

Then, the own vehicle position estimator 17 adds the moving distance and the orientation variation calculated at step S103 to the estimated own vehicle position X˜(t−1) calculated at the preceding time, and calculates the predicted own vehicle position X˜(t) (step S104). Furthermore, the own vehicle position estimator 17 refers to the landmark information in the map DB 10 based on the predicted own vehicle position X⁻(t) and searches for a landmark situated within the measurement range of the lidar 2 (step S105).

On the basis of the predicted own vehicle position X⁻(t), the position information, and the orientation information indicated by the landmark information corresponding to the landmark searched for at step S105, the own vehicle position estimator 17 calculates the predicted measurement value L⁻(t) including the relative angle L⁻$_\psi$ indicating the predicted orientation of the landmark according to the equation (3) (step S106). Furthermore, at step S106, on the basis of the measurement data outputted by the lidar 2 with respect to the landmark searched for at step S105, the own vehicle position estimator 17 calculates the measurement value L$_\psi$(t) including the relative angle L$_\psi$ indicating the predicted orientation of the landmark according to the equation (2).

Then, on the basis of the measurement accuracy by the lidar 2 and the map accuracy, the own vehicle position estimator 17 calculates the observation noise matrix R(t) shown in the equation (6) including the noise coefficient of the azimuth orientation ψ (step S107). Then, on the basis of the calculated observation noise matrix R(t), the own vehicle position estimator 17 calculates the Kalman gain K(t) having three rows and three columns according to the equation (5) (step S108). Thereby, the own vehicle position estimator 17 suitably forms a Kalman filter using the difference value between the measurement value and the predicted value with respect to not the position but also the azimuth orientation ψ.

Then, according to the equation (4), the own vehicle position estimator 17 calculates the estimated own vehicle position X^(t) by correcting the predicted own vehicle position X⁻(t) using the generated Kalman gain K(t) (step S109).

(5) Effect

Next, the effect of the own vehicle position estimation process using the orientation information regarding the landmark according to the present embodiment will be supplementally described.

Here, for comparison with the Kalman filter according to the present embodiment, a Kalman filter (also referred to as "Kalman filter according to the comparative example") not using the difference value between the measurement value and the predicted value of the azimuth orientation ψ will be discussed. According to this comparative example, the own vehicle position estimator 17 calculates the measurement value L(t) based on the following equation (10), and calculates the predicted measurement value L⁻(t) based on the following equation (11).

$$L(t) = \begin{bmatrix} L_x(t) \\ L_y(t) \end{bmatrix} = \begin{bmatrix} r(t)\cos\theta(t) \\ r(t)\sin\theta(t) \end{bmatrix} \quad (10)$$

$$\overline{L}(t) = \begin{bmatrix} \overline{L}_x(t) \\ \overline{L}_y(t) \end{bmatrix} = \begin{bmatrix} \cos\overline{\psi}(t) & \sin\overline{\psi}(t) \\ -\sin\overline{\psi}(t) & \cos\overline{\psi}(t) \end{bmatrix} \begin{bmatrix} M_x(i) - \overline{x}(t) \\ M_y(i) - \overline{y}(t) \end{bmatrix} \quad (11)$$

Then, the own vehicle position estimator 17 calculates the estimated own vehicle position X^(t) based on the equation (12).

$$\begin{bmatrix} \hat{x}(t) \\ \hat{y}(t) \\ \hat{\psi}(t) \end{bmatrix} = \begin{bmatrix} \overline{x}(t) \\ \overline{y}(t) \\ \overline{\psi}(t) \end{bmatrix} + \begin{bmatrix} k_{11}(t) & k_{12}(t) \\ k_{21}(t) & k_{22}(t) \\ k_{31}(t) & k_{32}(t) \end{bmatrix} \begin{bmatrix} L_x(t) - \overline{L}_x(t) \\ L_y(t) - \overline{L}_y(t) \end{bmatrix} \quad (12)$$

In this case, in order to calculate the three parameters x^, y^, ψ^ that are the elements of the estimated own vehicle position X^, the own vehicle position estimator 17 uses the difference value between the measurement value L(t) and the predicted measurement value L⁻(t) for the two elements, the x direction and y direction. Therefore, in this case, when calculating the estimated own vehicle position X^(t) by use of one landmark, there is an issue that the position and orientation are not uniquely determined.

Figure 10A:
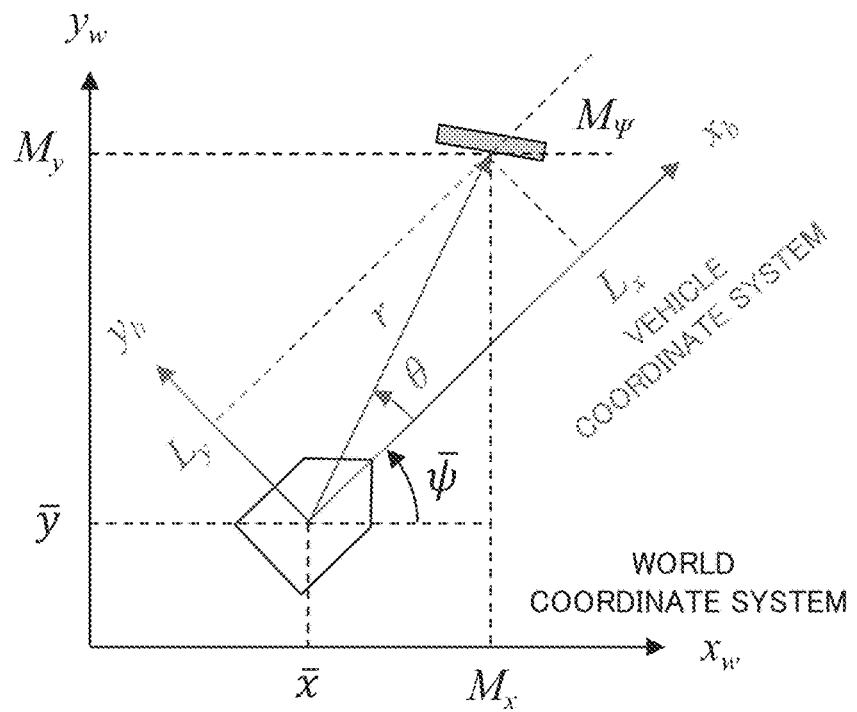
FIG. 10A and FIG. 10B illustrate the positional relationship between the vehicle and a landmark in the world coordinate system and in the vehicle coordinate system.
Figure 10B:
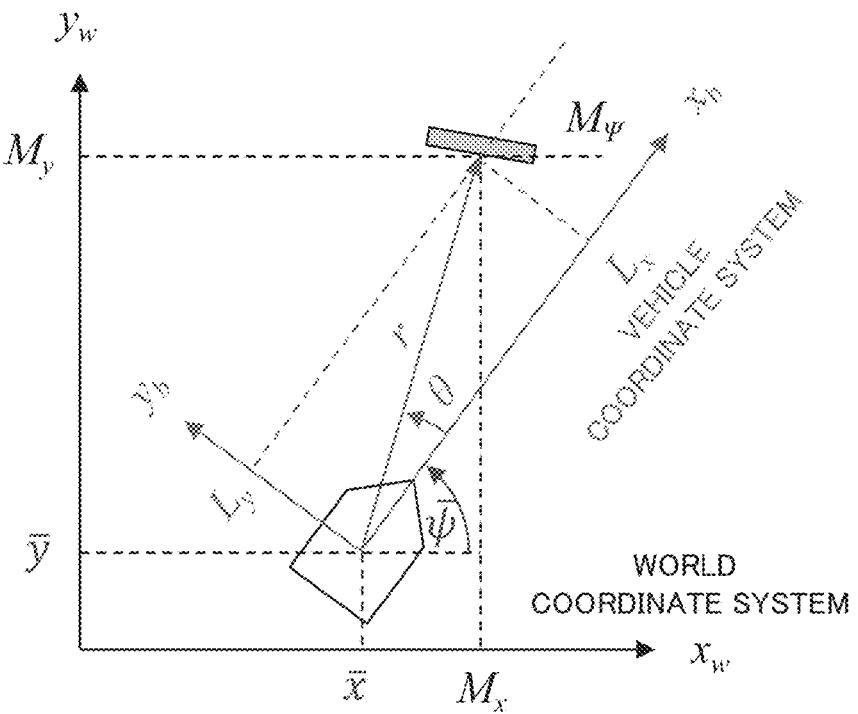

FIG. 10A and FIG. 10B shows different positional relationships between the vehicle and the landmark in the world coordinate system and in the vehicle coordinate system with respect to the same measurement values L$_x$ and L$_y$. As shown in FIG. 10A and FIG. 10B, even when the calculated measurement values L$_x$ and L$_y$ are constant, the positional relationship between the vehicle and the landmark is not uniquely determined depending on only the measurement values L$_x$ and L$_y$, and therefore the illustrated positional relationships between the vehicle and the landmark are different from each other. Specifically, in the example of FIG. 10B, x⁻ is larger, y⁻ is smaller, and the orientation ψ⁻ is larger than those in the example of FIG. 10A, respectively.

Next, a description will be given of respective simulation results to which the Kalman filter according to the embodiment and the Kalman filter according to the comparative example are respectively applied. As a representative example, the applicant performs the simulation for 60 seconds in a virtual environment where the vehicle is stopped and one landmark is present at a position 10 m away from the vehicle while intentionally adding the error information (4 [m/s] to the velocity and 0.4 [rad/s] to the angular velocity) to predicted own vehicle position X⁻(t).

Figure 11A:
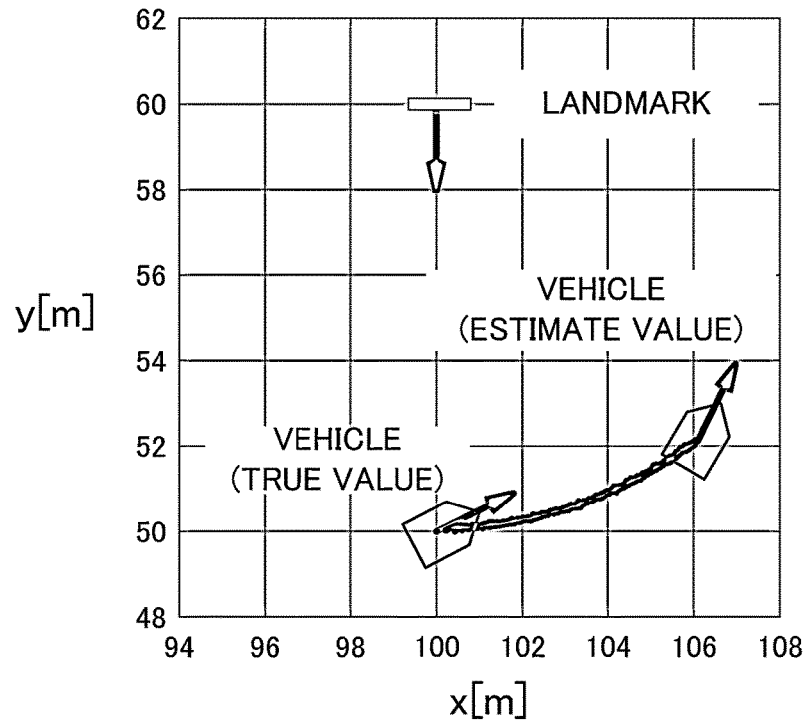
FIG. 11A and FIG. 11B illustrate a simulation result of the vehicle position estimation based on the Kalman filter according to a comparative example.
Figure 11B:
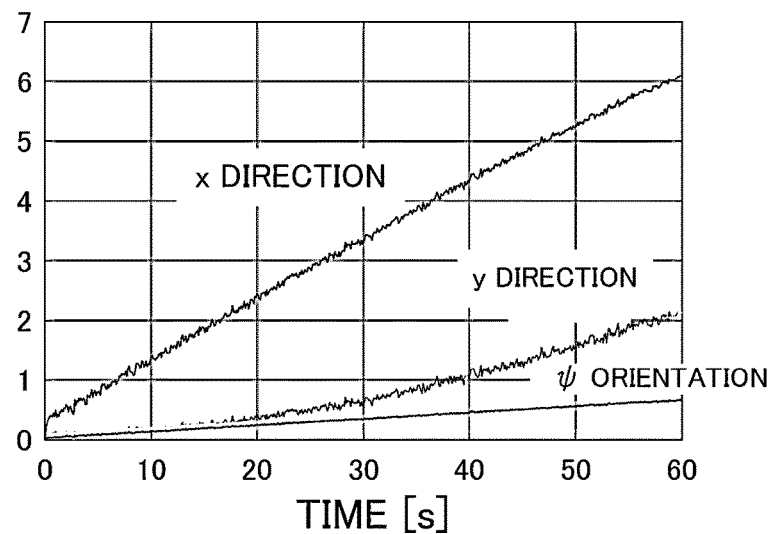

FIGS. 11A and 11B show the simulation results of the vehicle position estimation based on the Kalman filter according to the comparative example. Specifically, FIG. 11A shows the locus of the estimated position (estimate value) of the vehicle based on the Kalman filter according to the comparative example along with the correct position (true value) of the vehicle and the position of the landmark. The arrows in the drawing represent the orientation of the landmark and vehicle, respectively. Further, FIG. 11B illustrates graphs of the error between the estimate value and the true value with respect to the x-direction, y-direction, and the azimuth orientation ψ.

As shown in FIGS. 11A and 11B, in the comparative example, although the distance from the vehicle to the landmark is kept constant, the estimated position of the vehicle gradually deviates from the true value. Thus, in the comparative example, when the target landmark of the measurement is one, since the difference value between the measurement value L(t) and the predicted measurement value L⁻(t) for the two elements, the x-direction and y-direction, is used to calculate the three parameters x^, y^, ψ^ that are the respective elements of the estimated own vehicle position X^. As a result, the predicted own vehicle position X⁻(t) with the error cannot be accurately corrected.

Figure 12:
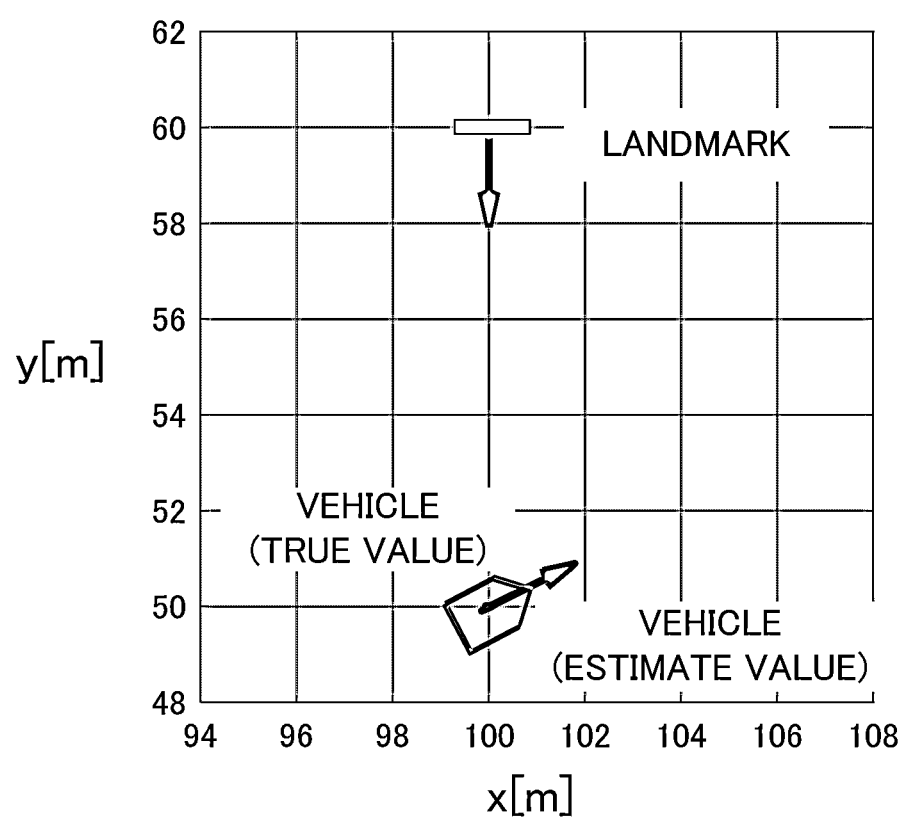
FIG. 12 is a plan view illustrating the locus of the estimate position of the vehicle based on the Kalman filter according to the embodiment along with the true position of the vehicle and the true position of the landmark.
Figure 13A:
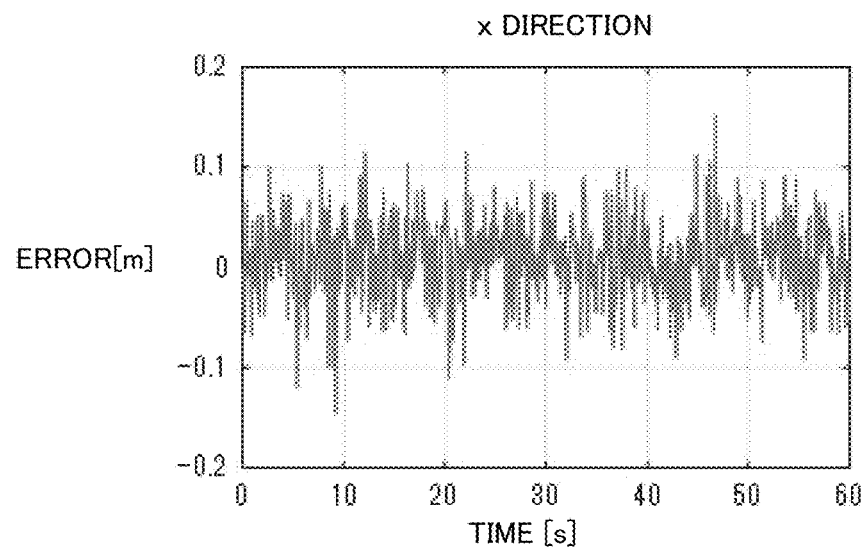
FIG. 13A is a graph showing the error in the x-direction of the estimate value relative to the true value.
Figure 13B:
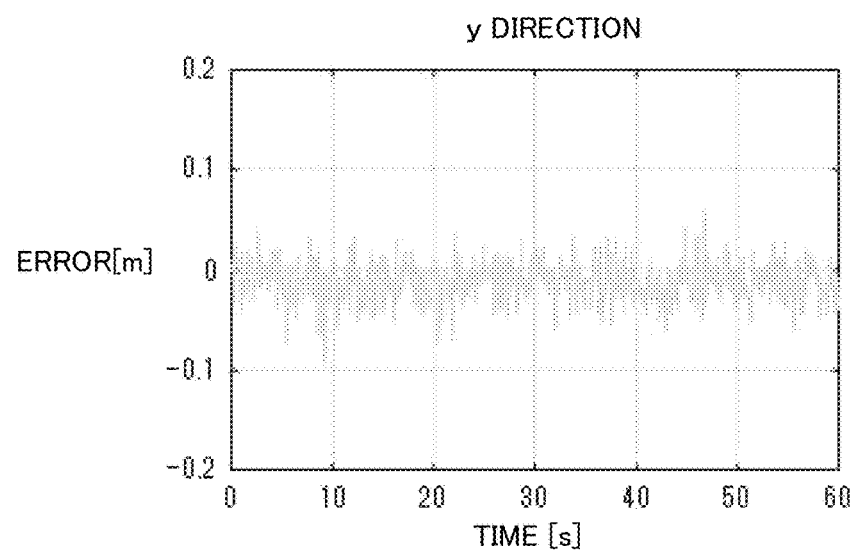
FIG. 13B is a graph showing the error in the y-direction of the estimate value relative to the true value.
Figure 13C:
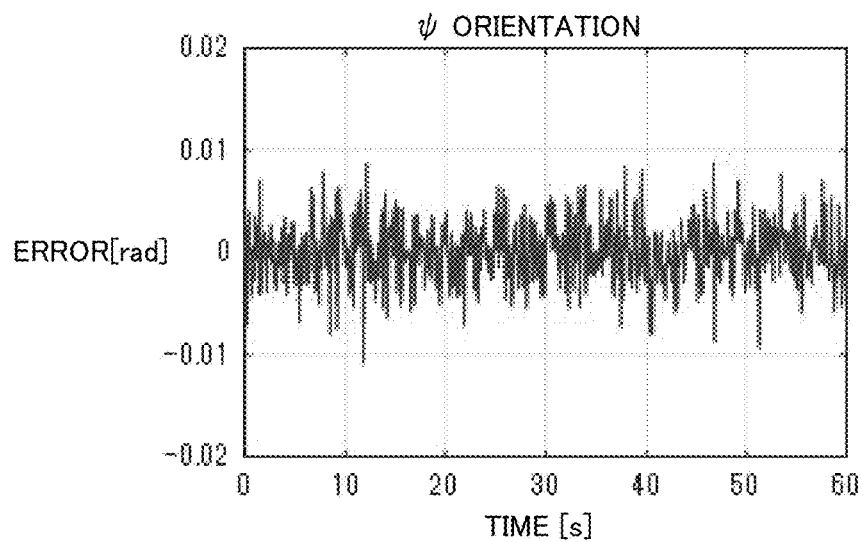
FIG. 13C is a graph showing the error of the orientation y of the estimate value with respect to the true value.

FIG. 12 and FIGS. 13A to 13C are diagrams showing simulation results of own vehicle position estimation based on the Kalman filter according to the present embodiment. Specifically, FIG. 12 shows the locus of the estimated position (estimate value) of the vehicle based on the Kalman filter according to the present embodiment (see the equation (4)), along with the actual position (true value) of the vehicle and the position of the landmark. Further, FIG. 13A is a graph showing an error between the estimate value and the true value in the x direction. FIG. 13B is a graph showing an error between the estimate value and the true value in the y direction. FIG. 13C is a graph showing an error between the estimate value and the true value in the azimuth orientation ψ. The scale of the vertical axis of the graph shown in FIGS. 13A to 13C is much smaller than the scale of the vertical axis of the graph shown in FIG. 11B showing an error with respect to the comparative example.

As shown in FIG. 12 and FIGS. 13A to 13C, in the present embodiment, by applying the Kalman filter using the orientation information of the landmark, the orientation of the landmark as viewed from the vehicle is suitably fixed. As a result, the predicted own vehicle position $X^-(t)$ with the error is suitably corrected, little deviation occurs in the position estimation. As described above, when using the Kalman filter according to the present embodiment, even when one landmark is a measurement target, it is possible to suitably calculate an accurate estimated own vehicle position $\hat{X}(t)$.

As described above, the own vehicle position estimator 17 of the in-vehicle device 1 according to the present embodiment acquires the predicted own vehicle position $X^-(t)$ that is a predicted value of the present position and the orientation of the moving body. Then, the own vehicle position estimator 17 acquires: the relative angle $L_\psi(t)$ that is first orientation (direction) information indicative of the orientation of the landmark with respect to the vehicle specified based on the measurement data of the landmark by the lidar 2; and the relative angle $L^-_\psi(t)$ that is second orientation (direction) information indicative of the orientation of the landmark with respect to the vehicle into which the orientation of the landmark indicated by the landmark information is converted. The own vehicle position estimator 17 corrects the predicted own vehicle position $X^-(t)$ based on the difference between the relative angle $L_\psi(t)$ and the relative angle $L^-_\psi(t)$. Thus, even in a situation in which only one landmark can be detected, the own vehicle position estimator 17 can accurately correct the predicted own vehicle position $X^-(t)$, which is a predicted value of the present position and the orientation of the moving body and determine the estimated own vehicle position $\hat{X}(t)$.

Modification

The configuration of the driving support system shown in FIG. 1 is an example, and the configuration of the driving support system to which the present invention is applicable is not limited to the configuration shown in FIG. 1. For example, instead of the driving support system having the in-vehicle device 1, the electronic control device of the vehicle may execute the process which the own vehicle position estimator 17 of the in-vehicle device 1 is supposed to execute. In this case, the map DB 10 is stored, for example, in the storage unit in the vehicle, and the electronic controller of the vehicle may appropriately receive the update information of the map DB 10 from a server device (not shown).

DESCRIPTION OF REFERENCE NUMERALS

1 On-vehicle device
2 Lidar
3 IMU
4 Vehicle speed sensor
5 GPS receiver
10 Map DB

What is claimed is:

1. A position estimation device comprising:
an acquisition unit configured to acquire a predicted value including a present position of a moving body and an orientation of the moving body;
a first calculation unit configured to calculate, on a basis of a measurement value of a feature by a measurement device mounted on the moving body, a first orientation indicative of an orientation of the feature in a coordinate system with respect to the moving body;
a second calculation unit configured to calculate a second orientation indicative of an orientation in the coordinate system with respect to the moving body into which an azimuth orientation of the feature indicated by map information is converted; and
a correction unit configured to correct the predicted value based on a difference between the first orientation and the second orientation.

2. The position estimation device according to claim 1, wherein the correction unit corrects the predicted value based on:
a first difference that is the difference; and
a second difference between a measurement distance from the moving body to the feature and a predicted distance measured by the measurement device, the measurement distance being measured by the measurement device, the predicted distance being predicted based on position information regarding the feature included in the map information.

3. The position estimation device according to claim 1, wherein the correction unit corrects the predicted value using the difference multiplied by a Kalman gain.

4. The position estimation device according to claim 1, wherein the correction unit corrects the predicted value of the present position using the difference multiplied by a first Kalman gain, and
wherein the correction unit corrects the predicted value of the orientation using the difference multiplied by a second Kalman gain.

5. The position estimation device according to claim 1, further comprising:
a third calculation unit configured to calculate measurement accuracy of the first orientation based on measurement accuracy of distance by the measurement device,
wherein the correction unit determines, on a basis of the measurement accuracy of the distance and orientation, an observation noise coefficient to be used to calculate Kalman gain.

6. The position estimation device according to claim 1, wherein, when the feature includes a landmark having a planar shape, information on the orientation of the feature indicates a normal direction to a plane formed on the landmark.

7. The position estimation device according to claim 6, wherein the landmark includes a signboard.

8. The position estimation device according to claim 1, wherein, when a compartment line is provided on a road surface, information on the orientation of the feature indicates a direction in which the compartment line extends.

9. An estimation device comprising:
a first calculation unit configured to calculate, on a basis of a measurement value of a feature by a measurement device mounted on a moving body, a first orientation indicative of an orientation of the feature in a coordinate system with respect to the moving body;

a second calculation unit configured to calculate a second orientation indicative of an orientation in the coordinate system with respect to the moving body into which an azimuth orientation of the feature indicated by map information is converted; and an estimation unit configured to estimate at least one of a present position of the moving body and an orientation of the moving body based on a difference between the first orientation and the second orientation.

10. A control method executed by a position estimation device, the control method comprising:

acquiring a predicted value including a present position of a moving body and an orientation of the moving body;

calculating, on a basis of a measurement value of a feature by a measurement device mounted on the moving body, a first orientation indicative of an orientation of the feature in a coordinate system with respect to the moving body;

calculating a second orientation indicative of an orientation in the coordinate system with respect to the moving body into which an azimuth orientation of the feature indicated by map information is converted; and correcting the predicted value based on a difference between the first orientation and the second orientation.

11. A non-transitory computer readable medium storing a program executed by a computer, the program causing the computer to function as:

an acquisition unit configured to acquire a predicted value including a present position of a moving body and an orientation of the moving body;

a first calculation unit configured to calculate, on a basis of a measurement value of a feature by a measurement device mounted on the moving body, a first orientation indicative of an orientation of the feature in a coordinate system with respect to the moving body;

a second calculation unit configured to calculate a second orientation indicative of an orientation in the coordinate system with respect to the moving body into which an azimuth orientation of the feature indicated by map information is converted; and a correction unit configured to correct the predicted value based on a difference between the first orientation and the second orientation.

* * * * *